May 14, 1940. D. B. BAKER ET AL 2,200,764
FUEL TANK AND SEAT MOUNTING
Filed Nov. 6, 1937
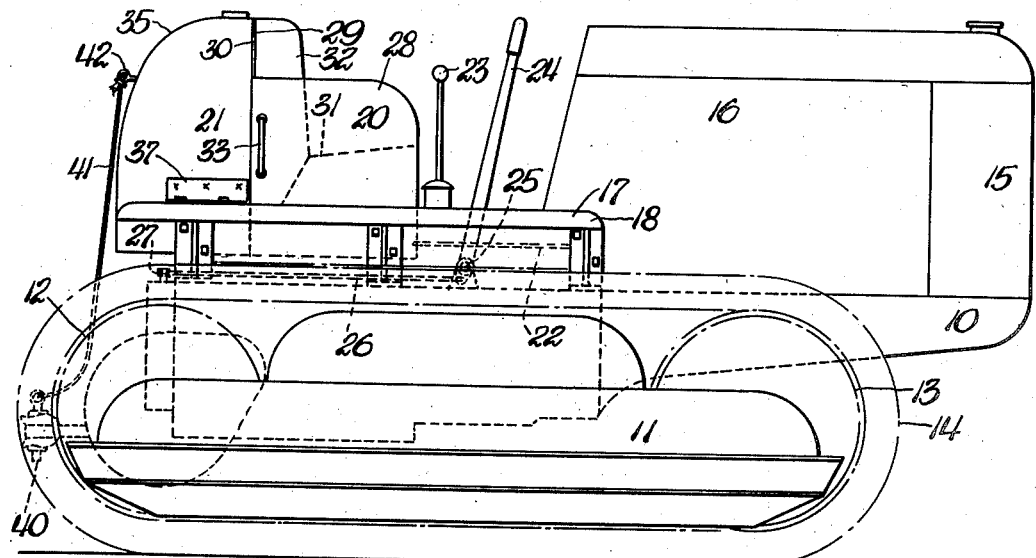
Fig. 1
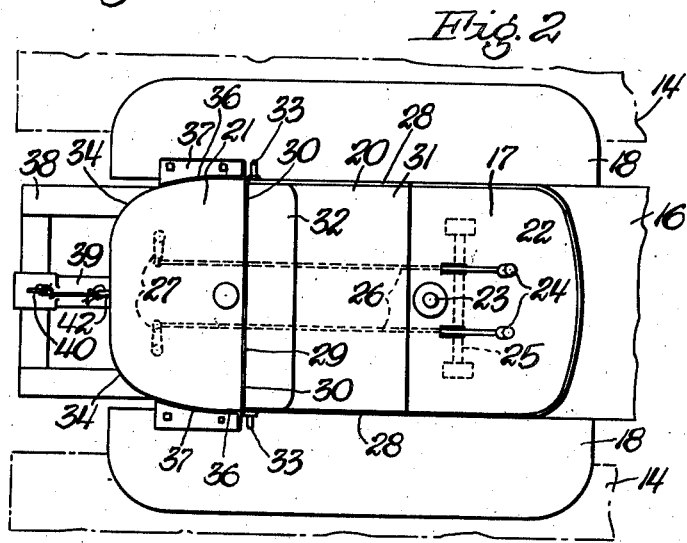
Fig. 2
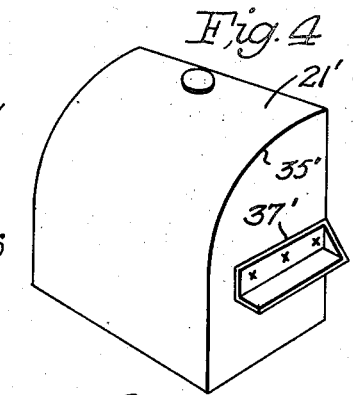
Fig. 4
Fig. 5
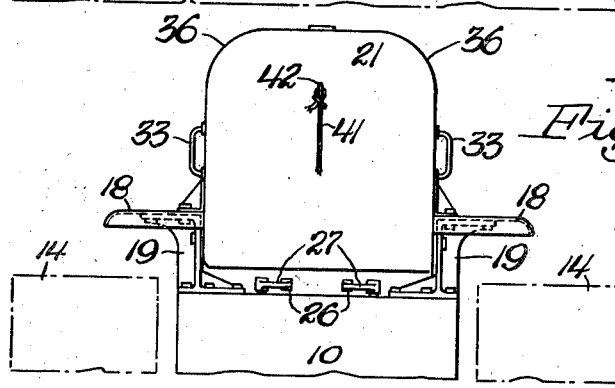
Fig. 3
Inventors
D. B. Baker
C. R. Rogers
W. O. Bechman
By V. F. Lassagne Atty.

Patented May 14, 1940

2,200,764

UNITED STATES PATENT OFFICE 2,200,764

FUEL TANK AND SEAT MOUNTING

David B. Baker, Riverside, Clifford R. Rogers, Oak Park, and William O. Bechman, Chicago, Ill., assignors to International Harvester Company, a corporation of New Jersey Application November 6, 1937, Serial No. 173,068

4 Claims. (Cl. 280—5)

This invention relates to an operator's seat and fuel tank construction for a tractor and particularly to the arrangement of the seat and fuel tank with respect to the operator's deck of the tractor.

The invention contemplates the provision of the above mentioned operator's seat and fuel tank, especially for use in a tractor of the crawler or track-laying type. Certain characteristics inherent in the construction of a tractor of this type involve numerous difficulties in construction and operation of the tractor, such as distribution of weight, operator's visibility, appearance, etc. The invention is concerned in one respect with the problem of distribution of weight. In this particular, most tractors of the crawler type have their side track frames pivoted on a horizontal axis on a cross-shaft adjacent or concentric with the axis of the drive sprockets of the tractor, and the forward end of the tractor is carried on a transverse equalizer spring supported by the side track frames, as is well understood by those skilled in the art. In order to provide for proper weight distribution and ease of operation, it becomes important to locate as much of the extra weight of the tractor as possible closely adjacent, above or rearwardly of the track frame pivot axis. Those parts which make up this extra weight include, for example, the operator's seat and the fuel tank. With regard to the operator's visibility, the fuel tank is preferably disposed rearwardly of the operator's seat inasmuch as the engine hood of the tractor is already of sufficient length to constitute a visibility problem. If the fuel tank were to be placed ahead of the operator's seat and closely adjacent the engine hood, it would necessarily be of such small size, in order to enhance visibility, that fuel capacity would be materially sacrificed. Since most tractors of the type disclosed are of a large type and subjected to heavy duty operation, it is necessary that they be powered with engines of the Diesel type. These engines are ordinarily of considerable size and the engine hood length is increased to such an extent that installation of a proper capacity fuel tank behind the engine hood creates a difficult problem. It will be appreciated also that installation of the fuel tank closely adjacent the engine hood increases weight forwardly of the track frame pivot axis, which is undesirable. Disposition of the fuel tank substantially above the track frame pivot axis and rearwardly of the operator's seat necessarily moves the operator's seat forwardly, which is desirable inasmuch as the operator is in a more convenient position with respect to the control levers, the positions of which are ordinarily governed by the position of the transmission and other drive mechanisms of the tractor. With respect to both appearance and operator's visibility, the fuel tank, as provided in the present invention, may include walls inter-joined by curved surfaces co-extensive therewith. This provision of curved surfaces enhances the appearance of the tractor in harmony with the principles of modern design, and at the same time increases visibility to the rear by removing obstructions caused by sharp and protruding corners. From the standpoint of construction, the present invention contemplates a simple and sturdy structure that is easily mounted in position with respect to the operator's deck of the tractor.

The principal object of the invention is to provide an operator's seat and fuel tank structure for a tractor, especially with consideration for weight distribution, operator's visibility and appearance.

An important object is to provide a seat and fuel tank structure in which the back portion of the seat is provided with curved corners and in which the fuel tank is provided with curved surfaces co-extensive with the walls of the fuel tank and substantially coincident with the periphery of the seat back.

Another object is to provide curved or rounded surfaces on the fuel tank whereby such surfaces will materially enhance the operator's visibility and the appearance of the entire tractor.

Briefly, these and other desirable objects may be achieved in one practicable form of the invention, as illustrated, by mounting the improved seat and fuel tank construction on the operator's deck of the tractor adjacent the rear end thereof with the fuel tank disposed at the rear of the seat. The corners of the seat back are rounded or curved and certain surfaces of the fuel tank are rounded or curved to substantially coincide with the same contour. In most tractors of the crawler type, longitudinal fenders are disposed at opposite sides of the main frame and above the respective crawler track chains. Inasmuch as these fenders are disposed at a height substantially above the top of the main frame, an ideal mounting is provided for the seat and the fuel tank with these units depending between the fenders and having their lower portions spaced above the top of the main frame to accommodate linkage between the tractor driving mechanism and control levers associated with the operator's deck and forwardly of the seat.

A more complete understanding of these desirable objects may be had from the following detailed description taken in conjunction with the accompanying sheet of drawings, in which:

Figure 1 is a side elevational view of the tractor showing the seat and fuel tank in position on a tractor of the crawler type;

Figure 2 is a plan view of the rear portion of the same, illustrating the coordination between the tractor structure and the contour of the seat and fuel tanks;

Figure 3 is a rear elevational view of the upper portion of the tractor showing the fuel tank and its mounting on the fenders carried by the tractor main frame;

Figure 4 is a perspective view of a fuel tank embodying a modified form; and,

Figure 5 is a perspective view of the fuel tank shown in Figures 1, 2 and 3, showing the relation of the curved surfaces to each other.

The tractor illustrated is a crawler type tractor, the main parts of which are of more or less conventional design. A longitudinally extending main frame 10 is supported on a pair of oppositely disposed longitudinally extending side track frames 11, only one of which is shown. A rear drive sprocket wheel 12 and a front idler wheel 13 are generally indicated as associated with the side track frame 11 in the usual manner. An endless crawler track chain is trained about the sprocket and idler wheel as indicated at 14. In the present disclosure of the tractor, the side track frames are pivotally carried for vertical movement about a horizontal pivot axis coincident with the center of the driving sprocket 12. This construction supports the rear end of the tractor, and the forward portion of the tractor is supported on the side track frames 11 in the usual manner as, for example, on a transverse equalizer spring, not shown. The tractor engine, not shown, is enclosed behind a radiator 15 and by an engine hood 16. An operator's deck, generally indicated by the numeral 17 is located rearwardly of the engine hood 16 and is substantially delineated at opposite sides by a pair of longitudinally extending fenders 18, which are disposed respectively above each crawler track chain 14. One practicable form of means for mounting these fenders is best disclosed in Figures 1 and 3 and comprises a plurality of brackets 19 located in longitudinally spaced relation along each side of the rearward portion of the main frame. Each of these brackets is substantially Z-shaped and includes a lower horizontal portion which is secured to the main frame and an upper horizontal portion to which the fender is secured. As best shown in Figure 3, this type of fender mounting does not interfere with clearance between the side of the main frame and the inner edge of the track chain 14. It will be also noted that the fenders are disposed a considerable distance above the main frame.

Generally, the operator's deck 17 and its component parts comprise an operator's seat 20 and a fuel tank 21, all of which is located rearwardly of the rear end of the engine hood 16, being substantially delineated at opposite sides by the fenders 18. The seat 20 is spaced rearwardly of the engine hood 16 and a floor or platform 22 is disposed in the space slightly above the top of the main frame 10. A gear shifter lever 23 is located closely adjacent the forward end of the seat and is operably associated with the tractor transmission, not shown. Other control levers, such as steering levers 24, are pivotally carried on a transverse rock-shaft 25 supported on the main frame. The lower ends of these levers 24 are operably connected by linkages 26 to operating arms 27, at the rear of the tractor, which are operably associated with the track driving and steering mechanism, not shown.

The seat 20 embodies an improved construction which includes a pair of oppositely disposed symmetrical side walls 28 and a substantially upright transverse rear wall 29. The top edge of the wall 29 and a side wall thereof meet in a curve, both sides of the seat back being symmetrical to provide rounded or cut off corners as at 30. It will be understood, of course, that a continuous curve formed by a single radius about a single center, or any other curve, could be provided as a means toward the same end. The seat is provided with a seat cushion 31 and a back cushion 32, said back cushion being provided with a contour that conforms to the contour of the seat back. The entire seat construction is supported by the fenders 18 and depends therebetween with its lower portion in vertical spaced relation with respect to the top surface of the tractor main frame 10. This provision is made to accommodate the rearward extension of the linkages 26. The seat is provided at each side respectively with a handle 33 to assist the operator in mounting the operator's deck 17.

The fuel tank 21 is provided with front, rear, top and side walls and a bottom, the front wall and bottom being formed preferably as flat surfaces. It will be noted from an examination of Figures 1, 2 and 3, that the front wall of the fuel tank is preferably placed against the rear wall 29 of the operator's seat 20, being formed with its edges substantially coincident with the contour of said seat rear wall. The side walls of the tank are joined to the bottom of the tank and to the rear wall, meeting said rear wall in curved surfaces co-extensive therewith as at 34. It is obvious that a curve provided by a single radius about a single center would be merely a modification of the same design, as would be any other curve. The rear wall of the tank is joined at its lower end to the bottom of the tank body and curves upwardly and forwardly, meeting the top wall in a curved surface co-extensive therewith, as at 35, and with the aforesaid curved surfaces 34. Similarly, each side wall and the top meet in a curved surface co-extensive therewith as at 36 and with the aforesaid two surfaces, said three curved surfaces meeting in a co-extensive surface substantially the section of a sphere. Here again it will be noted that curved surfaces formed on a single radius about a single center, or in any other manner, are merely matters of design. It will be noted also that the curved surfaces 36 at their forward portions are substantially coincident with the curved corners 30 of the rear seat wall 29. Each side wall of the tank carries a bracket 37 which is welded or otherwise secured thereto. This bracket is in the form of an angle member and has a horizontal flange which is secured preferably to the upper horizontal surface of the fender 18. The fuel tank is then supported on the fenders 18 and depends therebetween, having its lower portion terminating substantially adjacent the lower portion of the seat for the same purpose of accommodating the rearward extension of the linkages 26.

A draw-bar structure 38 is carried by the main frame in the usual manner and includes a swinging type draw-bar 39. A clevis pin 40 is carried by the draw-bar, being utilized for the connection of implements to the tractor. A flexible connection in the form of a pull cord or chain 41 is connected at one end to an eye in the clevis pin and at the other end to an eye 42 secured to the rear wall of the fuel tank.

In the modification shown in Figure 4, a fuel tank 21', somewhat similar to the fuel tank 21, is provided with a curved surface as at 35' between and co-extensive with the top and rear walls thereof. This tank 21' is provided with a supporting bracket 37' substantially identical to the supporting bracket 37 on the tank 21.

In the operation of the tractor, it is often necessary to make numerous connections and disconnections between the tractor and implements drawn thereby. In order that the operator may remain on the seat and still make the above referred to disconnections, it is important that the fuel tank be cleared of obstructing corners or projections so that the operator may easily reach the pull cord 41 to withdraw the clevis pin 40. The rounded corners 30 of the seat rear wall 29 and the curved surfaces 36 of the fuel tank 21 permit the operator freely to move his arms rearwardly. Also, it is important that the operator have clear and unobstructed vision when he is backing the tractor into position to be connected to an implement to be drawn thereby. The curved surface 35 of the tank 21, or the surface 35' of the tank 21' largely enhances the operator's visibility toward the rear and downwardly. The operator's visibility is further enhanced by the provision of the rounded or curved surfaces 34, which permit an unobstructed view downwardly at each side of the fuel tank.

In addition to the structural features incorporated in the seat and fuel tank construction, it will be noted that the contour of the tank contributes materially to the appearance of the tractor. This feature is especially important in connection with the trend of modern design.

It is obvious, of course, that the preferred construction disclosed permits of numerous alterations in design and structure which, however, do not depart from the spirit and scope of the invention as defined in the appended claims.

What is claimed is:

1. In a tractor having a main frame, a seat carried thereabove and adjacent the rear end thereof, said seat including a pair of oppositely disposed side walls and a substantially upright transverse rear wall, and a fuel tank carried above the main frame at the rear of the seat and formed with a bottom and front, rear, top and side walls, said front wall being of a height substantially coincident with the height of the rear wall of the seat and lying closely adjacent thereto, said side walls of the tank lying substantially within the respective planes of the side walls of the seat, said top and rear walls of the tank meeting in a curved surface co-extensive with said top and rear walls, said rear wall and a tank side wall meeting in a curved surface co-extensive therewith and with the first curved surface, and said top wall and a side wall meeting in a curved surface co-extensive therewith and with the aforesaid curved surfaces, said three surfaces meeting in a co-extensive surface substantially the section of a sphere.

2. In a tractor having a main frame, a seat carried thereabove and adjacent the rear end thereof, said seat including a pair of longitudinally extending vertical side walls and a substantially upright transverse rear wall, the upper edge of said wall being curved to join the side edges, and a fuel tank carried above the main frame at the rear of the tank and formed with front, rear, top and side walls and a bottom, said front wall having its upper and side edges formed substantially coincident with the seat rear wall, said top wall and a side wall of the tank meeting in a curved surface co-extensive therewith and substantially coincident with the curved edge of the tank front wall, and said tank side walls lying respectively in the vertical planes of the seat side walls.

3. In a tractor having a main frame, a forwardly disposed engine hood and an operator's deck rearwardly of the hood, said deck being substantially delineated at opposite sides by a pair of longitudinally extending fenders, the combination with the operator's deck of a combined operator's seat and fuel tank structure, said seat including a pair of side walls associated respectively with the fenders and a transverse, substantially upright rear wall across the side walls, said side walls and the side edges of the rear wall lying within the respective planes of the inner edges of the fenders, said fuel tank being supported by the fenders behind the seat and formed with front, rear, side and top walls and a bottom, the height and width of said front wall being substantially coincident with the height and width of the seat rear wall, and said top and rear walls of the tank meeting in a curved surface co-extensive therewith.

4. In a tractor having a main frame carried on ground supports at each side thereof, said main frame including a pair of fenders respectively positioned above the ground supports, each of said fenders including a portion disposed at a height above the main frame, and an operator's seat disposed above the main frame, the combination with the fenders of a fuel tank carried by the fenders at rear of the seat and including substantially flat, opposite side walls, and a pair of brackets secured respectively to the side walls and to the fenders, a lower portion of the fuel tank depending from said brackets and between the fenders.

DAVID B. BAKER.
CLIFFORD R. ROGERS.
WILLIAM O. BECHMAN.